United States Patent

Darr et al.

[15] 3,640,745
[45] Feb. 8, 1972

[54] METHOD OF PREPARING PIGMENTARY TITANIUM DIOXIDE

[72] Inventors: Donald E. Darr, Wadsworth, Ohio; G. Byron Edwards, Moundsville, W. Va.; Clifford E. Loehr, Akron; Elgin E. Young, Doylestown, both of Ohio

[73] Assignee: P.P.G. Industries, Inc., Pittsburgh, Pa.

[22] Filed: July 25, 1969

[21] Appl. No.: 844,970

[52] U.S. Cl..................................................106/300, 23/202
[51] Int. Cl.............................................................C09c 1/36
[58] Field of Search..........................................106/300

[56] References Cited

UNITED STATES PATENTS

| | | | |
|---|---|---|---|
| 3,208,866 | 9/1965 | Lewis | 106/300 |
| 3,214,284 | 10/1965 | Wilson | 106/300 |
| 3,498,757 | 3/1970 | Allen | 106/300 X |
| 3,505,091 | 4/1970 | Santos | 106/300 |

*Primary Examiner*—Tobias E. Levow
*Assistant Examiner*—H. M. S. Sneed
*Attorney*—Chrisholm and Spencer

[57] ABSTRACT

Agglomerated pigmentary titanium dioxide is prepared by vapor phase oxidation of titanium halide in a reaction chamber at elevated temperatures in the presence of controlled amounts of alkali metal cation and auxiliary gas.

21 Claims, 1 Drawing Figure

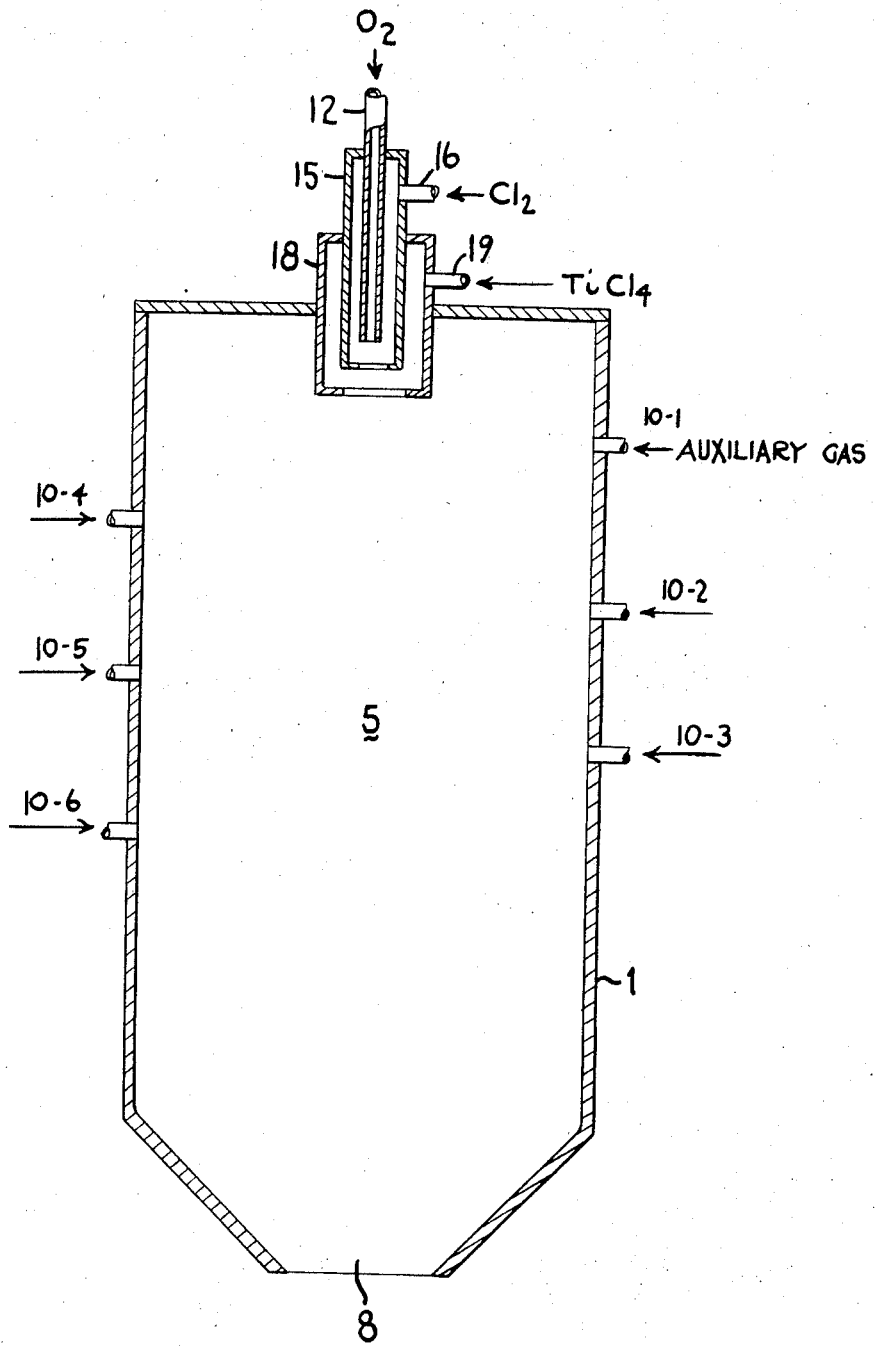

METHOD OF PREPARING PIGMENTARY TITANIUM DIOXIDE

BACKGROUND OF THE INVENTION

In the production of titanium dioxide by vapor phase oxidation of titanium halide, either in the presence or absence of a fluid bed, vaporous titanium halide is oxidized by reaction with oxygen-containing gas, such as oxygen, air, and oxygen-enriched air, in a reaction zone maintained at temperatures at which the titanium halide and oxygen react. When the reactants are, for example, titanium tetrachloride and oxygen, reaction temperatures are above about 950° F. and typically are between about 1,500° F. and about 3,000° F. When rutilizing agents, e.g., metallic aluminum, zirconium and compounds thereof, are present in the reaction zone, titanium dioxide having a high rutile content is produced.

Titanium dioxide of the rutile modification has a high refractive index. Because of this property, pigmentary rutile titanium dioxide has been employed extensively in the paint and coating industry. In these industries, two vehicle systems are used principally. One such vehicle system is an oil or resin-based system. Another is a water-based or emulsion system. Typically, the former system is used for enamel type paints and coatings, while the latter is used in the preparation of emulsion (latex) type paints and coatings. The manner in which these two vehicle systems wet pigment incorporated therein and the nature of the dry film formed by these vehicle systems are different. Therefore, in order to develop optimum hiding in films using such vehicle systems, the properties of pigment used in each of the aforementioned systems should be different.

The applications to which the pigment industry has put pigmentary titanium dioxide are varied and each class of application requires a pigment with particular properties. As mentioned hereinbefore, two such applications are enamel and latex pigments. A further application is in plastics. There has arisen, therefore, a need for methods for producing titanium dioxide pigment of varying properties in the same process equipment.

SUMMARY OF THE INVENTION

It has now been discovered that agglomerated titanium dioxide pigment can be prepared by conducting the vapor phase oxidation of titanium halide in the presence of controlled amounts of both alkali metal cation and auxiliary gas. More particularly, this invention relates to a process which comprises oxidizing titanium halide with an oxygen-containing gas in the vapor phase in the presence of from 0.1 to 200 parts per million of alkali metal cation, based on titanium dioxide, and an agglomerating amount of an auxiliary gas. Still more particularly, this invention relates to agglomerated pigmentary titanium dioxide having a reactor discharge oil absorption of at least 20 and an ultimate weight median particle size of from about 0.20 to about 0.40 micron.

In another embodiment of the present invention, agglomerated titanium dioxide is prepared by altering the conditions under which nonagglomerated titanium dioxide is produced. In a further embodiment, the present invention relates to coatings and coating compositions of improved hiding power containing the aforesaid agglomerated titanium dioxide.

BRIEF DESCRIPTION OF THE DRAWING

The single figure is a diagrammatic cross section view of a concentric orifice burner fitted into an elongated cylindrical reaction chamber which is equipped with auxiliary gas ports along its length.

DETAILED DESCRIPTION

In the preparation of emulsion paint and coating compositions utilizing pigmentary titanium dioxide, it has been observed that a pigment composed principally of primary or ultimate pigment particles, i.e., the type typically used to prepare enamel type paints, gives poorer hiding of the substrate then an aggregated pigment, i.e., pigment composed of particles made up of two or more primary pigment particles bound together. A primary pigment particle is one that can only be reduced in size through fracture of the particle. An aggregated pigment, or aggregate, as it is often termed, is a group (two or more) of primary particles held tightly enough together to be considered as a unit working particle. When the density of the aggregate is high, it is considered to be a large primary particle. Such high density aggregates are typically avoided because their presence reduces the opacifying properties of the pigment. In contrast, when the primary particles are strongly associated together, yet spaced apart to give an open structure, an open structure aggregate is formed which is especially useful in coating applications using an emulsion vehicle system. This latter type of aggregate is often referred to as an agglomerate.

Although it is not intended to be limited to any particular theory, it is believed that an open structure aggregate has air spaces incorporated within the inner portion of each particle which are not occupied by the vehicle system into which the pigment is placed. Thus, when incident light strikes a coating or film containing such aggregated pigment, the degree to which the light is refracted is enhanced due to the greater difference in refractive indices across the pigment-air interface within the aggregated particle than across the pigment-vehicle interface. For example, when a ray of incident light strikes a rutile titanium dioxide pigment-air interface, the difference between the respective refractive indices, i.e., about 1.76 (2.76–1.0b), is greater than when the same ray of light strikes a pigment-vehicle interface where the difference between the respective refractive indices is about 1.26 (2.76–1.5).

An enamel paint formulation produces a dry paint film in which the vehicle or binder portion of the film is sufficient to wet completely the pigment and thereby give a high gloss finish to the dry film. Such a paint formulation typically has pigmentation of less than about 30 volume percent on the dry film and usually has a pigmentation of about 20 volume percent. The pigment is well dispersed in the vehicle and is composed essentially of primary pigment particles in order to maximize the opacifying power of each pigment particle. Such pigments typically have a reactor discharge oil absorption of from 15 to 19 and an ultimate weight median particle size of from 0.28 to 0.32 micron, i.e., the particle size fraction of rutile titanium dioxide which produces the maximum hiding power.

A latex or emulsion paint formulation produces a dry paint film in which the vehicle or binder portion of the film is insufficient to wet completely the pigment and, as a result, has an irregular, porous surface of relatively low specular reflection. Such a paint formulation typically has a pigmentation in excess of about 40 volume percent on the dry film, e.g., 50 to 60 volume percent. The larger amount of pigment loading in emulsion paint formulations, as compared to enamel paint formulations, is used to produce a film with additional hiding power in order to achieve complete hiding of the surface to which the film is applied with one application. This additional hiding power is obtained at the expense of gloss and other film properties such as scrubbability and stain removal. Pigments especially useful in emulsion paints typically have a reactor discharge oil absorption of from about 22 to 26.

It has now been discovered that open structure aggregates of pigmentary titanium dioxide can be controllably prepared in the same reactor system that is used to prepare non-aggregated pigment. The open structure, aggregated pigment produced by the process described hereinafter has a reactor discharge oil absorption of at least 20, usually from about 20 to about 35, and an ultimate weight median particle size of from about 0.20 to about 0.40 micron. Preferably, such pigment has an oil absorption of from about 22 to about 26 and an ultimate weight median particle size of from about 0.30 to about 0.35 micron. The aforementioned oil absorption and particle size values are those of the raw pigment.

The term "raw pigmentary titanium dioxide" is intended to mean and include reactor discharge pigment that has had the basic chemical composition of its surface substantially unaltered. Included within the term is untreated reactor discharge pigment, as well as reactor discharge pigment that has been physically treated by, for example, cooling, degassing, neutralization, classification, e.g., hydroseparation, etc. "Raw pigmentary titanium dioxide" is to be distinguished from a "finished" titanium dioxide pigment which is defined herein as a raw pigment which has been given one or more inorganic hydrous oxide and/or one or more organic chemical coatings.

The oil absorption of a pigment is the amount of oil required by a definite weight of that pigment to form a paste by mechanically mixing the oil and pigment to a specified consistency. The oil absorption is expressed in grams (or pounds) of oil per 100 grams (or pounds) of pigment and is governed, in part, by the effective particle size of the pigment, i.e., whether the pigment is present in an ultimate or aggregated form. Oil absorption can be measured by A.S.T.M. Method D–281-1, "Method of Test for Oil Absorption of Pigments."

The ultimate weight median particle size of a pigment can be determined by measuring and counting the pigment particles in several representative photographs with instruments such as a Zeiss TGZ–3 Particle Size Analyzer. In such an instrument, an iris diaphragm, illuminated from one side, is imaged by a lens in the plane of a glass plate. An enlargement of a photomicrograph, e.g., electronmicrograph, is laid on this glass plate. By adjusting the iris diaphragm, the diameter of the sharply defined circular light spot appearing on the enlargement can be changed and its area made to coincide with that of the individual particles. If particles deviate from a circular shape, this circular measuring mark must be so adjusted that projected portions of the particle equal in area the reentrant ones.

The different diameters of the iris diaphragm are correlated, via a commutator, with a number of telephone counters, e.g., 8, 12, 16, 24 or 48 counters, each counter covering a certain range of iris diameters. The use of 48 counters is preferred. When the measuring mark is equalized with a particle in the photograph, a foot switch is depressed. That switch activates the correlated counter, and a puncher marks on the photograph the counted particle. The photograph is then shifted until the next unmarked particle is over the stationary measuring mark, etc. About 1,000 particles can be analyzed in this manner in about 15 minutes. In addition to the individual counters, which can be set back to zero, the instrument is equipped with a counter which registers the total of all counted particles.

For purposes of the present invention, the "ultimate particle" which is measured and counted is basically equivalent to an individual titanium dioxide crystal as formed in the reactor. The titanium dioxide crystals are measured for the ultimate count regardless of whether or not they have been fused together on one side in the reactor. Particles which have lost their individual identities are considered to be part of a large particle and, accordingly, are counted as a single particle.

The information obtained from the particle size analyzer can be translated into graphs of cumulative weight as a function of particle size and number of or percent of particles as a function of particle size. This translation can be made automatically by a computer. When the cumulative weight sum is graphed against particle size, using the upper diameter value of each counter, or cell as it is often termed, the point on the cumulative weight curve which is equal to 50 percent of the total weight is defined as the weight median of the ultimate particles counted. The point on the axis, on which particle size is graphed, which corresponds to the median weight point on the cumulative weight curve, is defined as the weight median diameter of the ultimate particles counted or the ultimate weight median diameter. In other terms, the particle having the ultimate weight median diameter would weigh an amount equal to the amount represented by the median weight point on the cumulative weight curve.

In mathematical terms, the ultimate weight median diameter is defined by the following expression:

$$\frac{\int_0^{Dm} f(D)D^3 dD}{\int_0^{\infty} f(D)D^3 dD = 1} = 0.5 = \frac{\text{Fraction of the volume of pigment associated with ultimate particles with diameters less than or equal to } Dm}{\text{Total fraction of pigment}} = 1$$

wherein $Dm$ is the weight median diameter. In the above mathematical expression, the density of the pigment and $\pi/6$ (from $V=\pi D^3/6$) are ignored since they would be present in both the numerator and denominator. All of the above discussion assumes a spherical particle.

In the production of titanium dioxide by vapor phase oxidation of titanium halide, e.g., a trihalide such as titanium trichloride or tetrahalide such as titanium tetrachloride, the metal halide is reacted with an oxygen-containing gas at temperatures above 950° F. The titanium tetrahalide utilized is typically selected from the group consisting of titanium tetrachloride, titanium tetrabromide, and titanium tetraiodide or combinations thereof. Titanium tetrachloride is economically preferred. Titanium tetrafluoride is not considered useful in the aforesaid vapor phase process and is, therefore, excluded from the definition of titanium halide as used herein.

The oxygen-containing gas can be substantially pure oxygen or a gaseous stream containing free or elemental oxygen, e.g., air, oxygen-enriched air, or oxygen mixed with the products of a combustible gas, such as carbon monoxide, hydrogen, and hydrocarbons, e.g., methane, ethane and propane. Typically, the amount of oxygen used is in at least stoichiometric amounts, based on the titanium halide. Although greater or slightly less than stoichiometric quantities of oxygen can be employed, the amount of oxygen used usually ranges from about 0.9 to about 2.5 times that of stoichiometric amounts, and preferably, ranges from about 1.01 to about 1.5 moles of oxygen for each mole of titanium halide introduced into the reaction zone. More than stoichiometric quantities are provided to insure substantially complete oxidation of the titanium halide and other oxidizable compounds, e.g., metal halides, that are typically added to the reaction zone, e.g., elemental or compounds of aluminum, silicon, and alkali metals. It is economically desirable that the amount of oxygen used not be greater than 10 percent above the stoichiometric amount. It is likewise desirable that complete reaction of the titanium halide be accomplished because of the difficulty of handling product titanium dioxide containing substantial quantities of unreacted titanium halide.

Vapor phase oxidation of titanium tetrahalide with an oxygen-containing gas is conducted typically at temperatures above 950° F. Reaction temperatures usually range from about 1,500° F. to about 3,000° F., more often from 1,650° F. to 2,600° F. Reaction pressures can range from about 10 to about 150 pounds per square inch absolute.

In the production of pigmentary titanium dioxide, it has been found beneficial to introduce certain additives to the reaction zone to improve the titanium dioxide produced in the sense that a more acceptable commercial pigment is obtained. For example, if metallic aluminum or an aluminum compound, notably an aluminum salt, such as aluminum chloride, is added to the reaction zone in any convenient manner, e.g., by means of the titanium tetrahalide reactant stream or other suitable gaseous streams entering the reactor, the titanium dioxide product so produced is found to have an increased rutile content, typically in excess of 98 percent, and in most cases, above 99 percent. The amount of rutile promoting salts added to the reaction zone can vary within a wide range, although typically they will be employed in an amount sufficient to provide between about 0.1 and about 10 weight percent, preferably between about 1 and about 5.0 weight percent, and more preferably from about 1.5 to about 2.0 weight percent coreacted alumina, calculated as $Al_2O_3$, based on the amount of $TiO_2$ produced.

A silicon compound, notably a silicon halide, such as silicon tetrachloride, can also be introduced into the reaction zone by any convenient manner, e.g., with the titanium tetrahalide reactant stream or other suitable gaseous streams entering the reactor. Typically, the silicon compound additive is employed in amounts sufficient to provide from about 0.1 to about 1.0 weight percent, preferably from about 0.3 to about 0.75 weight percent coreacted silica, calculated as $SiO_2$, based on the amount of $TiO_2$ produced.

Alkali metals and/or water soluble inorganic compounds or water insoluble organic compounds thereof can also be introduced into the reaction zone. Particularly contemplated are compounds of sodium, potassium, lithium, rubidium and cesium. Potassium compounds have been found to give particularly beneficial results. Typical of the compounds that can be employed include, as exemplified by potassium compounds: inorganic potassium salts such as potassium chloride, potassium bromide, potassium iodide, potassium fluoride, potassium sulfate, potassium nitrate, potassium phosphate, potassium carbonate and potassium silicate; potassium oxide, potassium hydroxide; organic potassium salts such as potassium benzoate, potassium acetate and phenyl potassium; and mixtures thereof. Similar compounds of lithium, sodium, rubidium and cesium can also be used. The aforementioned alkali metals or compounds thereof can be added to the reaction zone in the form of a vapor, liquid or solid.

Although it is not intended to be limited to any particular theory, it is believed that the active specie of the alkali metal or compound thereof which affects the properties of the pigment is the alkali metal cation. Thus, the alkali metal or compound thereof used in the practice of the herein described process will be one that is ionizable at the temperatures at which the titanium halide oxidation reaction is conducted. Since alkali metals typically form a stable cation in compounds thereof, the use of alkali metal compounds provides a ready source of alkali metal cations.

The amount of alkali metal or compound thereof used in the practice of the present process is that amount which is sufficient to cause agglomeration of the pigment, i.e., an agglomerating or coalescing amount, and yield an open structure aggregate (agglomerate). Such amount will vary with the particular alkali metal used. Although not intending to be limited to any particular theory, it is believed that such variation in amounts is due to the difference in the ionization potentials of the respective alkali metals. For example, the first ionization potential, in volts, for the alkali metals are listed as: lithium—5.390; sodium—5.138; potassium—4.339; rubidium—4.176; and cesium—3.893 in the Handbook of Chemistry, Norbert A. Lange, Editor, McGraw-Hill Book Company, Inc., New York, Tenth Edition, pp. 111-112, 1961.

Although the use of alkali metals in an amount of from about 0.01 to 10,000 parts per million, based on titanium dioxide, has been described in U.S. Pat. No. 3,208,866, it has been discovered surprisingly that in order to obtain a titanium dioxide product of controlled agglomeration in the process described herein, small critical quantities of alkali metal are required. Specifically, from 0.1 to 200 p.p.m. of alkali metal, depending on the alkali metal chosen, is used. Table I lists the typical and preferred amounts of each alkali metal which Applicants have discovered are required to produce the product described herein. Since the amount varies with the alkali metal chosen, the amounts recited in Table I will be referred to generally as coalescing or agglomerating amounts.

TABLE I

| Alkali Metal | Amounts, p.p.m. on a $TiO_2$ Basis | |
| --- | --- | --- |
|  | Typical | Preferred |
| Lithium | 50-200 | 85-100 |
| Sodium | 10-100 | 20-50 |
| Potassium | 0.1-10 | 0.5-3 |
| Rubidium | 0.1-8 | 0.2-4 |
| Cesium | 0.1-4 | 0.1-2 |

As can be seen from Table I, rather limited, critical amounts of alkali metal are used. The use of amounts greater than that shown in the aforementioned table results in the production of nonagglomerated titanium dioxide, i.e., a product comprised of substantially primary pigment particles. Such a pigment produces a coating with poor hiding power when used in formulations having a pigment volume concentration above the critical pigment volume concentration. The use of amounts less than that shown in the aforementioned table results in the production of aggregates of particles outside of the range found most useful for a pigment, i.e., the properties of a coating utilizing such pigment are poor.

Of the alkali metals listed, potassium is preferred. Typically, less than 10 parts per million of potassium, on a $TiO_2$ basis, preferably, less than 5 parts per million of potassium are used. Exceptionally good results are obtained with from 0.5 to about 3 parts per million potassium.

Alkali metal levels within the reaction chamber can be maintained by any convenient method. For example, the quantity of alkali metal or alkali metal compound required to produce a desired level of alkali metal in the reaction chamber can be calculated and introduced into the reaction chamber by means of one or more of the entering gas streams or through a separate inlet port. The level of alkali metal on the titanium dioxide pigment produced can then be determined by conventional analytical techniques, such as by X-ray or spectrometer analysis and the amount of alkali metal or compound thereof introduced, adjusted, e.g., increased, reduced, or left at the same level, in response to said analysis. Alternatively, the oil absorption of the pigment produced can be measured and the alkali metal level adjusted in response to said measurement. An increase in the alkali metal concentration in the reaction zone will reduce the pigment oil absorption and a decrease in the alkali metal concentration will increase the pigment oil absorption.

The production of agglomerated titanium dioxide by the present process is advantageously conducted under substantially anhydrous conditions, i.e., less than 50 parts per million of water and typically less than 25 parts per million of water on a $TiO_2$ basis.

In addition to regulating and controlling the amount of alkali metal in the reaction chamber, it has been found that the production of agglomerated titanium dioxide requires the introduction of controlled amounts of auxiliary gas into the reaction chamber. The auxiliary gas should be chemically compatible with the reaction system, i.e., it should not react chemically with the reactants and products of reaction at the conditions under which the vapor phase oxidation reaction is conducted.

The amount of auxiliary gas introduced into the reaction chamber is that amount which is sufficient to produce the agglomerated titanium dioxide described herein, i.e., a coalescing or agglomerating amount. Such amount of auxiliary gas will depend to an extent on the heat loss characteristics of the reactor and the alkali metal concentration in the reactor. Generally, the lower the heat loss characteristics of the reactor per unit capacity, e.g., tons/day, the higher the alkali metal concentration (within the ranges described hereinabove) used and the greater the amount of auxiliary gas required to effect coalescence of the pigment to the degree described herein. Conversely, the higher the heat loss characteristics of the reactor per unit capacity, the lower the alkali metal concentration used and the lower the amount of auxiliary gas required to effect coalescence of the pigment. Typically, coalescing amounts of auxiliary gas range from about 5 to about 200 mole percent of the reacting gases, i.e., titanium halide and oxygen, introduced into the principal reaction zone, and usually range from about 50 to 200 mole percent, more usually from about 65 to 150 mole percent.

Exemplary of auxiliary gases which can be employed in the process described herein include: chlorine, nitrogen, carbon dioxide, noble gases such as helium, argon, xenon and krypton, as well as recycle gas derived from the reaction product, i.e., the gaseous portion of the effluent (reactor discharge) withdrawn from the reactor relieved of its $TiO_2$ burden. Recycle gas can contain oxygen, titanium tetrachloride, chlorine, combustion gases, e.g., carbon dioxide or carbon monoxide, as well as any other gases introduced into the reaction chamber. The exact composition will depend on the manner in which the vapor phase oxidation reaction is performed and the nature of the gaseous streams (reactant or other) introduced into the reactor. However, typically the recycle gas will be greater than 80 weight percent chlorine, usually greater than 90 weight percent chlorine.

The auxiliary gas typically has a temperature less than the temperatures prevailing within the reaction chamber. Usually, the auxiliary gas is introduced into the reaction chamber at temperatures between about 65° F. and 250° F., more usually between about 150° F. and about 200° F. Higher temperatures than 250° F. or lower temperatures than 65° F. can be used; however, such temperatures usually add heating and cooling costs to the process and are, therefore, not economically preferred. Although not intending to be bound by any particular theory, it is believed that the use of a cooler auxiliary gas in the amounts heretofore described moderates the temperatures in the reaction chamber outside the principal reaction zone and thereby, in combination with the alkali metal concentrations described, produces the coalesced pigment of the present process. Care, however, must be exercised in introducing the cooler auxiliary gas to prevent the addition of quantities of auxiliary gas which would quench the oxidation reaction or significantly lower the rutile content of the pigment produced.

The auxiliary gas stream can be introduced at any level or levels of the reaction chamber and at any angle to the axes of the chamber. Thus, the auxiliary gas can be introduced near the top of the reaction chamber, i.e., near the principal reaction zone, at the bottom of the chamber, at some point or points spaced along the length of the chamber, or in any combination thereof; and, can be introduced radially and/or tangentially to the principal axes of the reactor. Such introduction points can be located at different positions, i.e., radially and vertically, about the reactor. Preferably, the auxiliary gas is introduced at a point or at points adjacent to and/or just below but not directly into the principal reaction zone. By introducing cooler auxiliary gas adjacent to such zone, the most efficient use of said gas is achieved and, therefore, less gas is required to accomplish the desired result than if the auxiliary gas were introduced removed from the principal reaction zone. The principal reaction zone is that portion within the reaction chamber were substantially all of the reaction, e.g., greater than 75 percent, takes place. This zone is typically associated with the hottest portion of the reaction chamber and usually takes the form of a conical flame, often referred to as the chloride flame.

Advantageously, the present process is conducted in a diffuse or well mixed (stirred) type reactor. Such reactor is characterized by the backmixing or recirculation of gases in the reactor back to their point of entry into the reaction chamber. Diffuse flow can be represented by the flow of gas into and through a large chamber wherein each increment of gas has a different residence time. Diffuse flow is distinguishable from full displacement flow wherein each increment of admitted gas forces along and displaces the previously admitted increment and is essentially the same as the flow of water through a pipe. Such diffuse flow aids in the aspiration and mixing of the auxiliary gas introduced into the reactor with the products of reaction.

The present process is more particularly described in connection with the accompanying FIGURE which is a diagrammatic cross-sectional view of a concentric orifice annulus burner fitted into an elongated cylindrical reaction chamber. The burner apparatus is utilized to introduce vapor phase oxidation reactants into the reaction chamber.

The description of the accompanying FIGURE, recited hereinafter, is directed to the production of titanium dioxide by vapor phase oxidation of titanium tetrachloride with oxygen in order to give clarity and preciseness to the description. It should be noted, however, that variations in the particular arrangement and nature of the above-illustrated gaseous streams for producing titanium dioxide are contemplated and are within the scope of the present invention. In addition, although the apparatus in the accompanying FIGURE is depicted in vertical alignment, other arrangements, such as inclined from the vertical or a horizontal alignment, are contemplated.

Referring now to the FIGURE, there is shown reactor 1, which preferably is cylindrical. Reactor 1 can be fabricated from any suitable metallic material, e.g., steel or nickel, and can be internally lined with refractory brick or other equivalent heat resistant ceramic material if desired. Reactor 1, as shown, has a conical bottom terminating at outlet 8 for the withdrawal of product effluent. Traversing the shell of reactor 1 are inlet ports 10-1 through 10-6. These inlet ports can be positioned at various locations and heights around reactor 1. Although only six inlet ports are shown, more or less can be used. Inlet ports 10-1 through 10-6 can be provided with orifice and valve means, not shown, for the introduction of auxiliary gas into reaction chamber 5 in either a radial and/or tangential direction or in some direction defined by an angle therebetween. Angles of introduction other than perpendicular to the principal axis of the reactor can be used for the auxiliary gas. Reaction chamber 5 typically comprises a relatively unobstructed space to allow recirculation of the gases in the chamber.

There is further shown cylindrical concentric tubes 12, 15 and 18. Tube 15 is arranged to circumscribe tube 12, while tube 18 is arranged so as to circumscribe tubes 15 and 12. Tube 15 is provided with inlet port 16 for the introduction of a shroud gas, notably chlorine, and tube 18 is provided with inlet port 19 for the introduction of one of the two basic reactants, i.e., oxygen or titanium tetrahalide, e.g., titanium tetrachloride. Similarly, tube 12 can be used to introduce the other of the two basic reactants. Preferably, oxygen is introduced through tube 12 and titanium tetrachloride introduced through tube 18.

The shroud gas introduced through port 16 is chemically compatible with respect to the titanium halide and oxygen reactants and prevents the oxidation reaction from occurring adjacent to the burner assembly. Thus, titanium dioxide burner growth or scale which could plug the burner assembly is prevented. Examples of suitable shroud gas include: chlorine, nitrogen, carbon dioxide, helium, neon, krypton and argon. For purposes of the present process, the shroud gas is not considered as part of the auxiliary gas described hereinabove.

In conducting the process described herein, with respect to the accompanying FIGURE and a preferred embodiment thereof, vaporous titanium tetrachloride is charged to cylindrical tube 18 through port 19 at a temperature of about 800° F. Simultaneously, oxygen at a temperature sufficient to initiate and sustain the oxidation reaction is charged to the reactor through tube 12. Chlorine shroud gas in an amount sufficient to prevent mixing of the reactant gases adjacent to the burner apparatus is charged to cylindrical tube 15 through port 16 and potassium chloride in an amount sufficient to provide a potassium level of less than 5 p.p.m. is charged to the reactor through a port (not shown) at the top of the reactor. Silicon tetrachloride and aluminum chloride are introduced to the reactor with the titanium tetrachloride stream in amounts sufficient to provide between approximately 0.2 and 0.7 weight percent $SiO_2$ and between approximately 1 and 3.0 weight percent $Al_2O_3$ (on a $TiO_2$ basis). Recycle gas is charged to the reactor through port 10-1. After equilibrium is established, a sample of the titanium dioxide produced is analyzed for oil absorption and particle size and the amount of auxiliary gas and/or potassium chloride charged to the reactor adjusted in response to said analysis until the oil absorption and particle size are at the levels desired. When the oil absorption and particle size are within the ranges described hereinabove, the pigment is coalesced or agglomerated to the desired degree. The operation of a reactor similar to that of the accompanying FIGURE is suitably described in U.S. Pat. No. 3,214,284 which is incorporated herein, in toto, by reference.

Agglomerated pigmentary titanium dioxide produced in accordance with the herein described process will typically have a tinting strength value of from about 1,600 to 1,700, a tint tone of from about Brown −4 to Neutral, an oil absorption of from about 20 to about 35 and an ultimate weight median particle size of from about 0.20 to about 0.40 micron. The aforementioned values are those of the "raw pigment", e.g., reactor discharge product.

The process described herein thus gives flexibility to the chloride process for producing titanium dioxide and permits the chloride process $TiO_2$ producer to manufacture $TiO_2$ pigment with varying degrees of agglomeration. Such flexibility permits the $TiO_2$ producer to tailor make pigments for different customers or for different grades of pigment.

Titanium dioxide pigment produced in accordance with the procedures discussed hereinabove can be subjected to conventional processing after removal from the reaction chamber and separation from the gaseous effluent in which it is suspended. Thus, the pigment can be calcined, degassed, hydroseparated, digested, either in an alkaline or acid pH to remove occluded salts, coated with hydrous metal oxides, e.g., the hydrous oxides of titanium, aluminum and silicon, dried, micronized, etc., by any of the conventional treatments known in the art. The finished pigment is then especially suitable for use in the production of paints using a latex vehicle system.

In referring to various optical properties of pigments either in the description or examples which follow, the following tests for determining such properties, if not already discussed, can be employed. The tinting strength and tint tone of the pigment can be determined by A.S.T.M. Method D–332–26, "1949 Book of A.S.T.M. Standards", Part IV, page 31, published by American Society for Testing Materials, Philadelphia 3, Pennsylvania. The tint efficiency as used herein refers to the reflectometry method disclosed on pages 704 to 715, Volume 34, of the Journal of Paint Technology and Engineering, (Official Digest, July, 1962). The hiding power can be measured by A.S.T.M. Method D–344–39, "Relative Hiding Power of Paints". The alkali metal, e.g., potassium, level on the pigment can be determined by X-ray or spectrometer analysis.

The present process is more particularly described in the following examples which are intended as illustrative only since numerous modifications and variations therein will be apparent to those skilled in the art.

EXAMPLE I

In the following example, a reactor substantially similar to that depicted in the accompanying FIGURE was employed. The reactor was fabricated from a cylindrical steel shell and was lined internally with alumina silicate firebrick. Fitted at the top of the reactor was a cylindrical burner tube arrangement similar to that shown in the FIGURE. Production of pigmentary titanium dioxide in the reactor was conducted in accordance with the procedures described in U.S. Pat. No. 3,214,284. Oxygen in an amount of about 44 gram moles per minute and at a temperature sufficient to initiate and sustain the reaction was introduced into the reactor. Simultaneously therewith, about 35 gram moles per minute of titanium tetrachloride, at a temperature of approximately 830° F. was introduced into the reactor. Chlorine gas was admitted to the reactor between the oxygen and titanium tetrachloride streams in an amount sufficient to avoid mixture and reaction of the oxygen and titanium tetrachloride adjacent to the burner annuli. Sufficient silicon tetrachloride and aluminum chloride were added to the titanium tetrachloride stream to provide about 0.5 weight percent coburned silicon dioxide ($SiO_2$) and about 1.8 weight percent coburned alumina ($Al_2O_3$), both based on the amount of titanium dioxide produced. Sufficient potassium chloride was introduced into the reaction chamber to provide a level of 10 parts per million potassium based on the titanium dioxide produced. Recycle gas having a composition substantially the same as the gaseous portion of the effluent withdrawn from the reactor was introduced radially into the reactor through an inlet port represented by port 10-1 in the FIGURE. The recycle gas had a temperature of about 150° F. and was introduced in an amount of about 19 gram moles per minute.

Titanium dioxide produced in accordance with the above operation had a tinting strength of 1,730, a tint tone of Blue 2, a rutile content of 99 percent, an oil absorption of 16.3, and an ultimate weight median particle size of about 0.29.

A portion of the above pigment was coated with hydrous oxides of titanium and aluminum in amounts and in a manner similar to that described in U.S. Pat. No. 3,146,119, which is incorporated herein, in toto, by reference. The hydrous oxide coated pigment was incorporated into a conventional enamel paint formulation using an alkyd vehicle and pigment volume concentration of about 20 percent. Panels prepared from the aforesaid paint compositions matched similar paint panels prepared with the best commercially available enamel grade pigment in tint efficiency, tone, brightness and hiding power.

Another portion of the uncoated pigment was coated with hydrous oxides of titanium, aluminum and silicon in a manner analogous to that described in U.S. Pat. No. 3,146,119 and the thus coated pigment was incorporated into a conventional latex paint formulation extended with clay and using a polyvinyl acetate vehicle with a pigment volume concentration of about 60 percent. Panels prepared from this paint composition had a tint efficiency of only 80 percent. The low tint efficiency value shows that the hiding power of the pigment was substantially lower than that of a standard pigment used in latex paint formulations.

EXAMPLE II

The procedure of Example I was repeated except that the potassium level in the reactor was adjusted to provide between about 1 and 2 parts per million added potassium, based on the amount of titanium dioxide produced. The amount of recycle auxiliary gas introduced into the reaction chamber through inlet port 10-1 was about 15 gram moles per minute.

The titanium dioxide pigment produced by this process had a tinting strength of 1,650, a tint tone of Neutral, an oil absorption of 26.5, an ultimate weight median particle size of about 0.25, and a rutile content of 99 percent. Electron microscope photographs of this pigment confirm that the pigment is agglomerated. Portions of this pigment were coated with hydrous oxides of titanium, aluminum and silicon in amounts and in a manner similar to that of Example I. A portion of the hydrous oxide coated pigment was incorporated into a conventional latex paint formulation extended with clay and using a polyvinyl acetate vehicle with a pigment volume concentration of about 60 percent. This paint had a tint efficiency of 105 percent. In a similar paint composition, but with a pigment volume concentration of 40 percent, the paint was found to have a tint efficiency of 101 percent. Paints incorporating agglomerated pigment produced by the process described herein thus have improved hiding power than a paint prepared with a commercially available latex grade pigment that was used as the standard.

EXAMPLE III

The procedure of Example II was repeated except that the amount of recycle auxiliary gas introduced into the reaction chamber was about 29 gram moles per minute and the amount of potassium added to the reactor was adjusted to 10 p.p.m. The titanium dioxide pigment produced had a tinting strength of 1,640, a tint tone of Brown −1, an oil absorption of about 20 and an ultimate weight median particle size of about 0.28.

EXAMPLE IV

The procedure of Example III was repeated except that the amount of potassium added to the reactor was adjusted to about 8 p.p.m. and the amount of recycle auxiliary gas introduced into the reaction chamber through inlet port 10-1 was about 26 gram moles per minute. The titanium dioxide pigment produced had a tinting strength of 1,660, a tint tone of Neutral, an oil absorption of about 24, and an ultimate weight median particle size of about 0.27.

EXAMPLE V

The procedure of Example IV was repeated except that, in addition, about 50 gram moles per minute of recycle auxiliary gas was introduced into the reaction chamber through inlet port 10-6. The titanium dioxide pigment produced had a tinting strength of 1,660, a tint tone of Neutral, an oil absorption of 30, and an ultimate weight median particle size of about 0.27.

EXAMPLE VI

The procedure of Example II was repeated except that the amount of potassium added to the reactor was adjusted to about 0.3 p.p.m. based on the amount of titanium dioxide produced. The amount of recycle auxiliary gas introduced into the reactor through inlet port 10-1 was varied during this operation from about 9 gram moles per minute to about 17 gram moles per minute. The titanium dioxide pigment produced had an average tinting strength of 1,650 and tint tone of Neutral. The oil absorption increased with the increase of recycle gas and varied from about 23.1 to about 29.1 during the period of operation. The ultimate weight median particle size of the pigment produced also varied during the period of operation from about 0.26 to about 0.29.

EXAMPLE VII

Into a reactor similar to that depicted in the FIGURE were charged vaporous titanium tetrachloride at a temperature of about 800° F., and about a 12 percent stoichiometric excess of oxygen at temperatures sufficient to initiate and sustain the oxidation reaction. Gaseous chlorine was admitted to the reactor between the oxygen and titanium tetrachloride streams in an amount sufficient to prevent mixing and reaction of the aforesaid reactants adjacent to the burner surfaces. Sufficient silicon tetrachloride and aluminum chloride were added to the titanium tetrachloride stream to provide about 0.5 weight percent cooxidized silica ($SiO_2$) and about 1.8 weight percent cooxidized alumina ($Al_2O_3$), based on the amount of titanium dioxide produced. Sufficient potassium chloride was introduced into the reactor to provide a level of about 50 p.p.m. potassium on a $TiO_2$ basis. Recycle tail gas was radially introduced into the reactor through an inlet port corresponding to inlet port 10-6 in the FIGURE in an amount equal to about 100 cubic feet per minute. The titanium dioxide pigment produced had a tinting strength of 1,710, a tint tone of Blue −1, an oil absorption of about 16.8, a rutile content of over 99 percent, and an ultimate weight median particle size of about 0.27. When this pigment was incorporated into a conventional enamel paint formulation, it produced a paint which matched paints prepared with the best commercially available enamel grade pigment.

EXAMPLE VIII

The procedure of Example VII was repeated except that the amount of potassium chloride added to the reactor was reduced to provide about 1 p.p.m. potassium on a $TiO_2$ basis, the amount of recycle auxiliary gas was increased to about 275 cubic feet per minute and the auxiliary gas was introduced radially into the reactor through inlet ports corresponding to inlet ports 10-1 and 10-4 in the FIGURE. The titanium dioxide pigment produced had a tinting strength of 1,640, a tint tone of Brown −2, an oil absorption of about 23.4 and an ultimate weight median particle size of about 0.32.

The data of Examples I and VII show that at potassium levels of 10 p.p.m. and above and less than coalescing amounts of auxiliary gas, a pigment most useful in enamel paint formulations is produced. Example I further shows that such pigment is not suitable for use in latex or emulsion paint compositions for the reason that such pigment produces paint compositions of reduced hiding power.

The data Examples II, VI and VIII show that at potassium levels of less than 10 p.p.m. and with coalescing amounts of auxiliary gas, an agglomerated pigment having an oil absorption greater than 20 and an ultimate weight median particle size of between 0.20 and 0.40 is produced. The data of example II further show that such agglomerated pigment is useful in latex paint formulations and yields paint compositions of increased tint efficiency than a standard pigment used in latex paint formulations.

The data of Example III show that at potassium levels of about 10 p.p.m., a small amount of agglomeration can be produced in the pigment by increasing the amount of auxiliary gas to coalescing amounts. The data of example IV further show that when the potassium level of Example III is reduced to below 10 p.p.m., a significant amount of agglomeration is introduced into the pigment.

The data of Example V show that the degree of agglomeration of the pigment produced in Example IV can be increased by further increasing the amount of auxiliary gas introduced into the reactor.

While there are above described a number of specific embodiments of the present invention, it is obviously possible to produce other embodiments and various equivalent modifications thereof without departing from the spirit of the invention.

Having set forth the general nature and specific embodiments of the present invention, its scope is now particularly pointed out in the appended claims.

We claim:

1. A process of producing pigmentary titanium dioxide by vapor phase reaction of titanium halide and oxygen comprising, in combination, the steps of:
   a. oxidizing titanium halide in a reaction zone within a reactor;
   b. introducing a source and amount of alkali metal cation selected from the group consisting of lithium in the amount of from 50–200 parts, per million parts of $TiO_2$, sodium in the amount of from 10–100 parts, per million parts of $TiO_2$, potassium in the amount of from 0.1–10 parts, per million parts of $TiO_2$, rubidium in the amount of from 0.1–8 parts, per million parts of $TiO_2$, and cesium in the amount of from 0.1–4 parts, per million parts of $TiO_2$, into said reaction zone;
   c. introducing from 5–200 mole percent, based on titanium halide and oxygen, of chemically compatible auxiliary gas into said reactor, said auxiliary gas having a temperature less than the temperatures prevailing in the reactor;
   d. regulating the amounts of said alkali metal cation and said auxiliary gas thus introduced until such amounts, in combination, are sufficient to form agglomerated pigmentary titanium dioxide having a raw oil absorption of at least 20 and a raw ultimate weight median particle size of from 0.20–0.40 microns; and
   e. removing such pigmentary titanium dioxide from said reactor.

2. A process according to claim 1 wherein the titanium halide is titanium tetrachloride.

3. A process according to claim 1 wherein the pigmentary titanium dioxide has a raw oil absorption of from 20–35.

4. A process according to claim 1 wherein the pigmentary titanium dioxide has a raw ultimate weight median particle size of from 0.30–0.35 microns and a raw oil absorption of from 22–26.

5. A process according to claim 1 wherein the auxiliary gas is recycled reactor discharge gas that has been freed substantially of its $TiO_2$ burden.

6. A process according to claim 1 wherein from 65-150 mole percent, based on titanium halide and oxygen, of chemically compatible auxiliary gas is used.

7. A process according to claim 1 wherein the auxiliary gas has a temperature of from 65° F. to 250° F.

8. A process according to claim 3 wherein the reaction is conducted in a diffuse reactor under substantially anhydrous conditions.

9. A process of producing pigmentary titanium dioxide by vapor phase reaction of titanium tetrachloride and oxygen comprising, in combination, the steps of:
   a. oxidizing titanium tetrachloride in a reaction zone within a diffuse reactor in the presence of additives that provide from 0.1-10 weight percent co-reacted alumina and from 0.1-10 weight percent co-reacted silica, based on $TiO_2$;
   b. introducing a source of potassium cation into said reaction zone in amounts which provide from 0.1-10 parts potassium, per million parts of $TiO_2$;
   c. introducing from 5-200 mole percent, based on titanium tetrachloride and oxygen, of chemically compatible auxiliary gas into said reactor, said auxiliary gas having a temperature less than the temperatures prevailing in the reactor;
   d. regulating the amounts of said potassium cation and said auxiliary gas thus introduced until such amounts, in combination, are sufficient to form agglomerated pigmentary titanium dioxide having a raw oil absorption of at least 20 and a raw ultimate weight median particle size of from 0.20-0.40 microns; and
   e. removing such pigmentary titanium dioxide from said reactor.

10. A process according to claim 9 wherein the pigmentary titanium dioxide has a raw oil absorption of 20-35.

11. A process according to claim 9 wherein the pigmentary titanium dioxide has a raw ultimate weight median particle size of from 0.30-0.35 microns and a raw oil absorption of from 22-26.

12. A process according to claim 9 wherein less than 5 parts of potassium cation, per million parts of $TiO_2$, is introduced into said reactor.

13. A process according to claim 9 wherein the auxiliary gas is $TiO_2$-free reactor discharge gas.

14. A process according to claim 9 wherein the vapor phase reaction is conducted under substantially anhydrous conditions.

15. A process according to claim 9 wherein from 65-200 mole percent, based on titanium tetrachloride and oxygen, of auxiliary gas is used.

16. A process according to claim 9 wherein the auxiliary gas has a temperature of from 65° F. to 250° F.

17. A process for preparing agglomerated raw pigmentary titanium dioxide by vapor phase reaction of titanium tetrachloride and oxygen comprising, in combination, the steps of:
   a. oxidizing titanium tetrachloride in a reaction zone within a reactor;
   b. introducing a source of potassium cation into said reaction zone in amounts which provide from 0.1-10 parts potassium, per million parts of $TiO_2$;
   c. introducing from 5-200 mole percent, based on titanium tetrachloride and oxygen, of chemically compatible auxiliary gas into said reactor, said auxiliary gas having a temperature less than the temperatures prevailing in the reactor;
   d. regulating the amounts of said potassium cation and said auxiliary gas thus introduced until such amounts, in combination, are sufficient to form agglomerated pigmentary titanium dioxide;
   e. removing the agglomerated pigmentary titanium dioxide product from the reactor;
   f. analyzing such titanium dioxide product to determine the oil absorption thereof; and
   g. adjusting the feed rate of the auxiliary gas in response to said analysis to produce agglomerated pigmentary titanium dioxide having a raw oil absorption of from 20-35 and a raw ultimate weight median particle size of from 0.20-0.40 microns.

18. A process according to claim 17 wherein, in addition, the amount of potassium cation introduced into the reaction zone is adjusted in response to said analysis.

19. A process according to claim 17 wherein the auxiliary gas is reactor discharge gas having a temperature of from 65° F. to 250° F.

20. A process according to claim 17 wherein the agglomerated pigmentary titanium dioxide produced has a raw ultimate weight median particle size of from 0.30-0.35 microns and a raw oil absorption of from 22-26.

21. A process according to claim 17 wherein the vapor phase reaction is conducted in a diffuse reactor under substantially anhydrous conditions.

* * * * *